April 7, 1959 W. GUZMAN 2,881,039
FOLDING TABLE FOR USE IN AUTOMOBILES
Filed Dec. 2, 1957
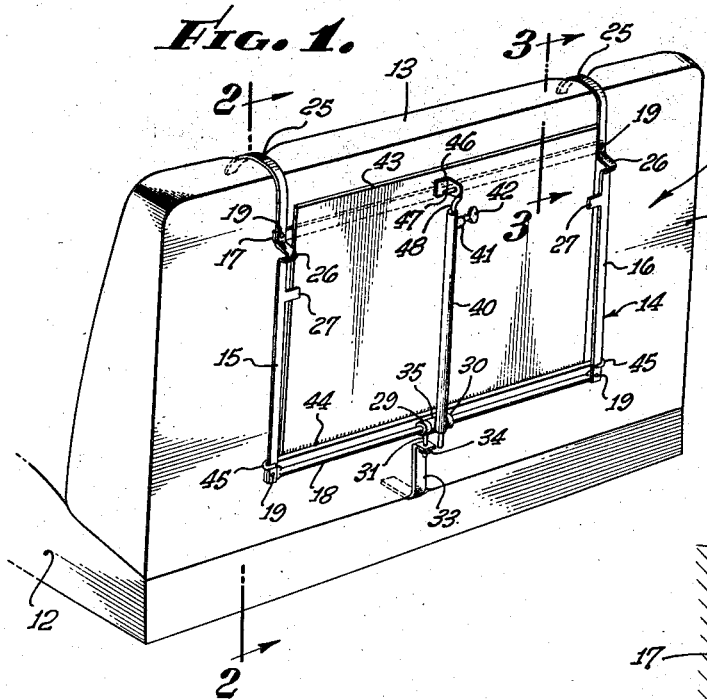
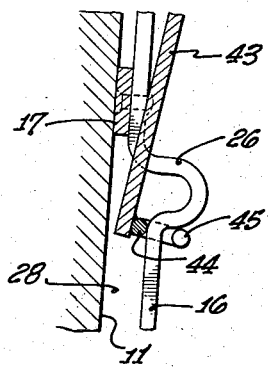
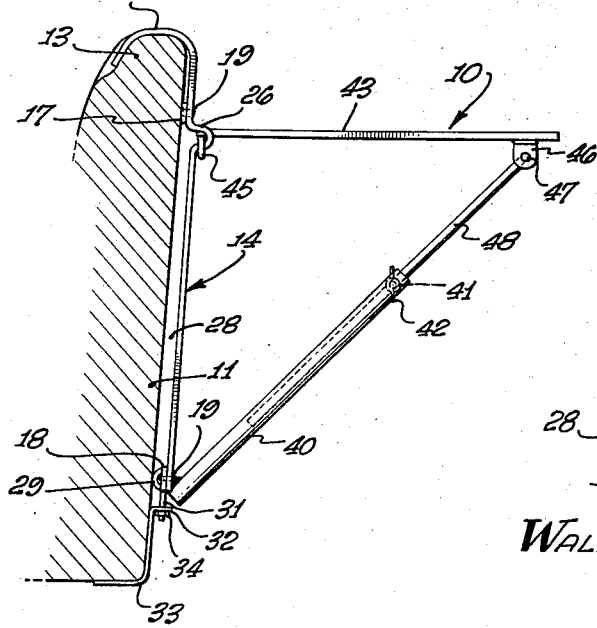
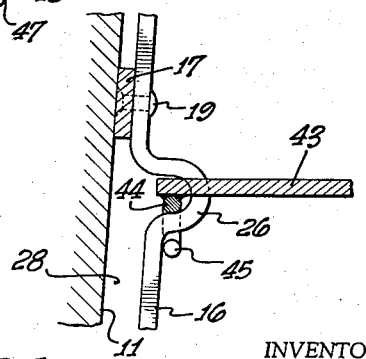
INVENTOR.
WALDEMAR GUZMAN,
BY
ATTORNEY.

United States Patent Office 2,881,039
Patented Apr. 7, 1959

2,881,039

FOLDING TABLE FOR USE IN AUTOMOBILES

Waldemar Guzman, Los Angeles, Calif.

Application December 2, 1957, Serial No. 700,169

2 Claims. (Cl. 311—21)

This invention relates to folding tables which are adapted to be attached to the back of the front seat of an automobile and which are normally folded against said back but are capable of extension to provide a table for use by passengers sitting in the rear seat of the automobile.

It is an object of this invention to provide such a folding table which is inexpensive to build, is readily demountable for shipment; which is extremely simple to operate; which includes few parts; which is of rugged construction; and which may be readily adapted to many different types of automobile seat backs or other supporting means.

The manner of accomplishing the foregoing objects as well as further objects and advantages will be made manifest in the following description taken in connecton with the accompanying drawings in which Fig. 1 is a diagrammatic perspective view of the back of the front seat of an automobile with a preferred embodiment of the present invention mounted thereon, and with the table folded.

Fig. 2 is an enlarged diagrammatic sectional view taken on the line 2—2 of Fig. 1 and illustrating the table of the invention unfolded and set up for use.

Fig. 3 is an enlarged fragmentary detail sectional view taken on the line 3—3 of Fig. 1 and illustrates an intermediate position of the table top of the invention while it is being unfolded.

Fig. 4 is a view similar to Fig. 3 and illustrates the manner in which the table top is locked in place automatically when the same has been extended into horizontal position for use.

Referring specifically to the drawings, the invention is there shown as embodied in a folding table 10 which is mounted on the back 11 of a front seat 12 of an automobile. The front side of the seat back 11 is provided with upholstery 13.

The folding table 10 includes a rectangular frame 14 having vertical side members 15 and 16 and horizontal cross members 17 and 18. The cross member 17 preferably comprises a flat bar and the cross member 18 preferably comprises a pipe, the ends of which are flattened. These frame members are secured together as by bolts or rivets 19.

Each of the upright frame members 15 and 16 has a hook 25 at its upper end, a short outward crook 26, and a table guide lug 27. By virtue of the shape of the crooks 26 in the uprights 15 and 16, the portion of these uprights between said crooks and the lower ends thereof are separated by a space 28 from the back 11 of the seat 12, when the table 10 is supported on said seat by the hooks 25 being hooked over the upholstery 13 at the upper end of the seat back 11.

Mounted on the pipe 18 are a pair of spaced collars 29 and 30. Collar 29 has a threaded stud 31 which is adapted to extend through an apertured lug 32 bent from the upper end of a bottom clamp 33 which fits around the lower edge of the seat back 11. A nut 34 applied to the lower end of stud 31 holds the clamp 33 upwardly and causes this clamp to cooperate with hooks 25 to solidly fasten the folding table 10 on the seat back 11.

Rotatable on the pipe 18 between the collars 29 and 30 is a collar 35 having secured thereto, as by welding, a tube 40 having a threaded boss 41 near its upper end which is adapted to receive a thumbscrew 42.

Mounted in the frame 14 is a rectangular table top 43 which may be made of a flat sheet of any kind of material but is shown herein as being made of metal and as being welded along its rear edge to a rod 44, end portions of which are bent into the form of hooks 45 which extend outwardly around the outer edges of the upright members 15 and 16.

When the table top 43 is folded as shown in Fig. 1, the lugs 27 overlie this and prevent the table top from swinging outwardly from its position within the frame 14. Fixed on the table top 43 is a bracket 46 which provides a bearing for the bent upper end 47 of a rod 48 which extends slidably into the tube 40.

To unfold the folding table 10 from its folded position as shown in Fig. 1, the thumbscrew 42 is unscrewed to relax its grip upon the rod 48, the table top 43 now being lifted upwardly, the hooks 45 sliding on the frame uprights 15 and 16 until these hooks come against the crooks 26 as shown in Fig. 3. The table top 43 is now tilted forwardly into horizontal position as shown in Fig. 4, this causing the hooks 45 to bear against the outer faces of the frame uprights 15 and 16 and thus hold the rod 44 in the crooks 26 so that the back edge of the table top 43 is supported by said rod on said crooks. When the front edge of the table top 43 has been lowered to bring the table top into horizontal position, as shown in Fig. 2, the thumbscrew 42 is tightened on the rod 47, thereby securely locking the table top in this position.

To fold the table, the thumbscrew 42 is loosened and the steps above described for opening the table are followed in reverse which returns the table top 43 to the position in which it is shown in Fig. 1.

From the above description it is seen that the present invention provides a very simple folding table for use in automobiles which is made of few parts, is of rugged manufacture, may be inexpensively produced and is very easy to use and, when collapsed, fits snugly against the back of the front seat 12 on which it is mounted so as to cause no inconvenience to the passengers occupying the front seat. The entire folding table 10 may be covered by a canvas or table cloth when not in use so that the mechanical details thereof are not exposed to view.

The claims are:

1. In a folding table, the combination of: a frame including vertical side members and means for attaching said frame to the back of a seat, there being crooks formed outwardly in said side members near their upper ends; a table top resting in upright position within said frame when folded; hooks provided on the lower corners of said table top so that when said table top is so folded, said hooks extend laterally and around the outside edges of said side frame members whereby said table top may be drawn upwardly with said hooks sliding on said side members until said hooks engage said crooks, and then rotated into horizontal position with said hooks entering said crooks and holding said table top with its adjacent edge supported on said crooks in said side members and with said hooks locked in place in said crooks until said table top is again elevated to a relatively steep inclination from horizontal; and means provided on said frame for engaging said table top at a point spaced a substantial distance outwardly from said hooks and thereby supporting said table top with the latter in said horizontal position.

2. A combination as in claim 1 in which said frame includes a lower cross frame member connecting said side members, and in which said table top support comprises a tube having a collar at its lower end which is rotatably mounted on said lower cross frame member, and a rod slidable in said tube, wing screw means for securing said rod in an adjusted position in said tube, and means for pivotally securing the upper end of said rod to said table top.

References Cited in the file of this patent

UNITED STATES PATENTS

| | | |
|---|---|---|
| 1,809,866 | Riesche | June 16, 1931 |
| 1,963,721 | Smith | June 19, 1934 |
| 2,474,943 | Hedger | July 5, 1949 |
| 2,483,043 | Golden | Sept. 27, 1949 |
| 2,585,742 | Condon | Feb. 12, 1952 |
| 2,682,438 | Davis | June 29, 1954 |
| 2,687,336 | Smith et al. | Aug. 24, 1954 |
| 2,693,400 | Erickson | Nov. 2, 1954 |
| 2,720,436 | Covey | Oct. 11, 1955 |